(12) United States Patent
Cheng et al.

(10) Patent No.: US 8,441,234 B2
(45) Date of Patent: May 14, 2013

(54) DETECTING MODULE FOR A BATTERY EQUALIZER AND METHOD FOR DETECTING A BATTERY EQUALIZER

(75) Inventors: Ming-Wang Cheng, Taipei (TW); Hsiang-Chun Hsueh, Taipei (TW)

(73) Assignee: Lite-On Clean Energy Technology Corp., Taipei (TW)

( * ) Notice: Subject to any disclaimer, the term of this patent is extended or adjusted under 35 U.S.C. 154(b) by 359 days.

(21) Appl. No.: 13/008,243

(22) Filed: Jan. 18, 2011

(65) Prior Publication Data

US 2012/0038321 A1    Feb. 16, 2012

(30) Foreign Application Priority Data

Aug. 10, 2010  (CN) .......................... 2010 1 0251071

(51) Int. Cl.
*H01M 10/44*     (2006.01)
*H01M 10/46*     (2006.01)
(52) U.S. Cl.
USPC ......................................................... 320/134

(58) Field of Classification Search .................. 320/107, 320/119, 128, 134, 136
See application file for complete search history.

(56) References Cited

U.S. PATENT DOCUMENTS

| 4,479,083 | A  | * | 10/1984 | Sullivan ......................... 320/123 |
| 6,150,795 | A  | * | 11/2000 | Kutkut et al. ................... 320/118 |
| 6,489,753 | B1 | * | 12/2002 | Patterson ....................... 320/162 |
| 6,801,014 | B1 | * | 10/2004 | Chitsazan et al. ............. 320/119 |

* cited by examiner

*Primary Examiner* — Edward Tso
(74) *Attorney, Agent, or Firm* — Rosenberg, Klein & Lee (57) ABSTRACT

A detecting module is for detecting a battery equalizer of a power supply device. The detecting module includes a current detecting unit, a drive circuit, and a control circuit. The current detecting unit is to be coupled to the battery equalizer and a battery set of the power supply device, and generates an output based on detected current flow through the battery equalizer. The drive circuit is to be coupled to the battery equalizer for driving operation of the battery equalizer. The control circuit is coupled to the drive circuit and the current detecting unit, controls the drive circuit to drive operation of the battery equalizer and determines, according to the output of the current detecting circuit, whether the battery equalizer is in a normal operating state.

11 Claims, 9 Drawing Sheets

DETECTING MODULE FOR A BATTERY EQUALIZER AND METHOD FOR DETECTING A BATTERY EQUALIZER

CROSS-REFERENCE TO RELATED APPLICATION

This application claims priority of Chinese Application No. 201010251071.0, filed on Aug. 10, 2010.

BACKGROUND OF THE INVENTION

1. Field of the Invention

The present invention relates to a detecting module for a battery equalizer and a method for detecting a battery equalizer.

2. Description of the Related Art

Currently, a battery set is used with a battery equalizer for equalizing an electrical input/output of each battery of the battery set during charge and discharge so as to increase service life of the battery set.

Figure 1:
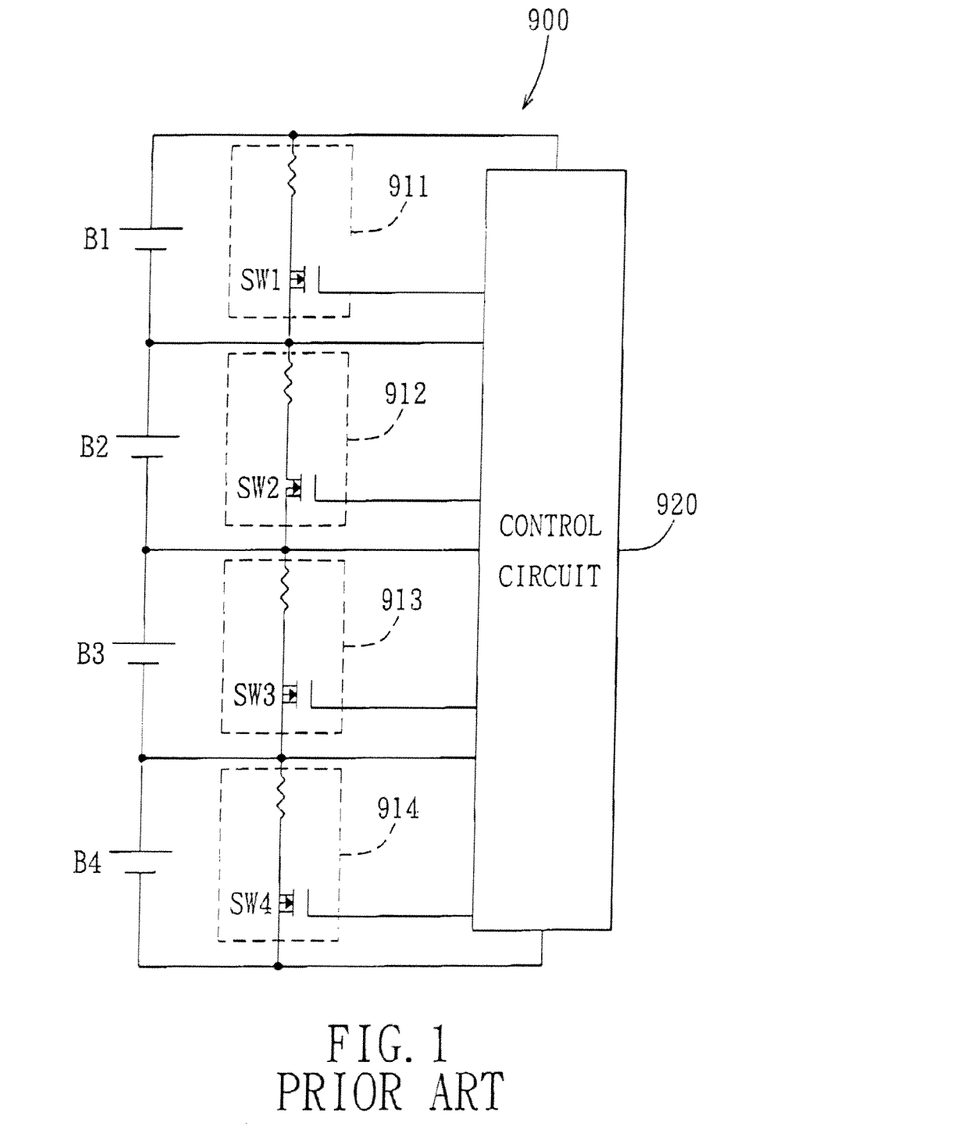
FIG. 1 is a schematic circuit diagram of a conventional power supply device.

Referring to FIG. 1, a conventional power supply device 900 includes a battery set having four batteries (B1) to (B4) that are connected to one another in series, four battery equalizers 911 to 914 respectively coupled to the batteries (B1) to (B4), and a control circuit 920. The battery equalizers 911 to 914 include switches (SW1) to (SW4), respectively. The control circuit 920 is operable to monitor a voltage value of each of the batteries (B1) to (B4), and to suitably control operation of the battery equalizers 911 to 914 so as to prevent the batteries (B1) to (B4) from damage caused by overcharging or over-discharging.

However, the control circuit 920 cannot detect the battery equalizers 911 to 914 such that the batteries (B1) to (B4) will be charged or discharged abnormally when any one of the battery equalizers 911 to 914 is in an abnormal operating state. For example, when the switch (SW1) of the battery equalizer 911 is in a short-circuited state, a corresponding one of the batteries (B1) may continuously discharge through the switch (SW1). Accordingly, an amount of electricity consumption of the power supply device 900 is increased, and the service life of the battery (B1) is shortened.

SUMMARY OF THE INVENTION

Therefore, an object of the present invention is to provide a detecting module for detecting a battery equalizer of a power supply device.

Accordingly, a detecting module of the present invention is configured for detecting a battery equalizer of a power supply device. The power supply device further includes a battery set. The detecting module comprises a current detecting unit, a drive circuit, and a control circuit.

The current detecting unit is to be coupled to the battery equalizer and the battery set of the power supply device, and generates an output based on detected current flow through the battery equalizer. The drive circuit is to be coupled to the battery equalizer for driving operation of the battery equalizer. The control circuit is coupled to the drive circuit and the current detecting unit, controls the drive circuit to drive operation of the battery equalizer, and determines, according to the output of the current detecting circuit, whether the battery equalizer is in a normal operating state.

Another object of the present invention is to provide a method for detecting a battery equalizer that is coupled to a battery set.

According to another aspect, a method of the present invention is to be implemented using a detecting module for detecting a battery equalizer that is coupled to a battery set. The method comprises the steps of:

a) configuring the detecting module to control operation of the battery equalizer for releasing energy stored in the battery set to the battery equalizer;

b) configuring the detecting module to detect a current flow passing through the battery equalizer; and c) configuring the detecting module to determine whether the battery equalizer is in a normal operating state according to the current flow detected in step b).

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Before the present invention is described in greater detail, it should be noted that like elements are denoted by the same reference numerals throughout the disclosure.

Figure 2:
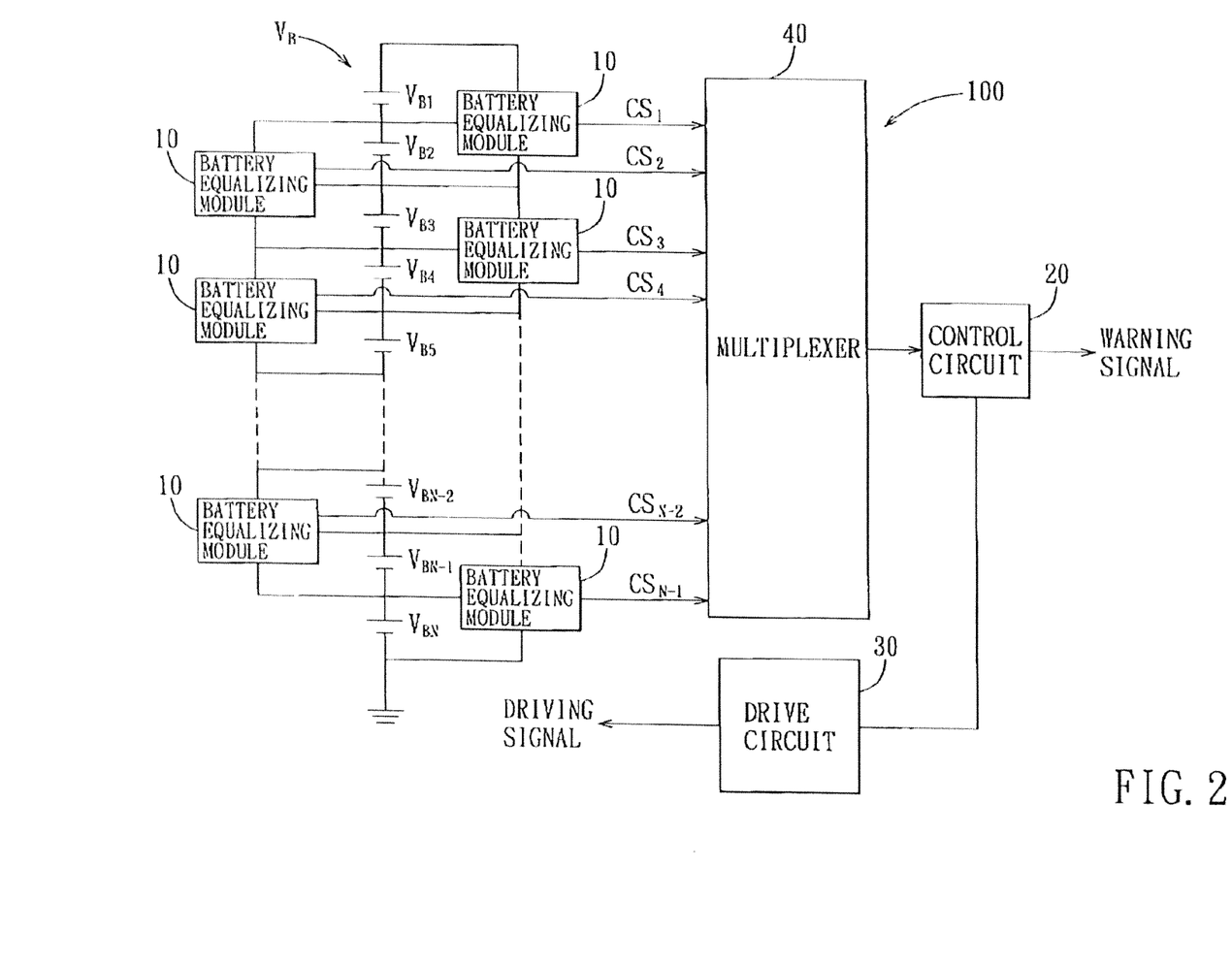
FIG. 2 is a schematic circuit diagram of a first preferred embodiment of a power supply device according to the present invention.
Figure 3:
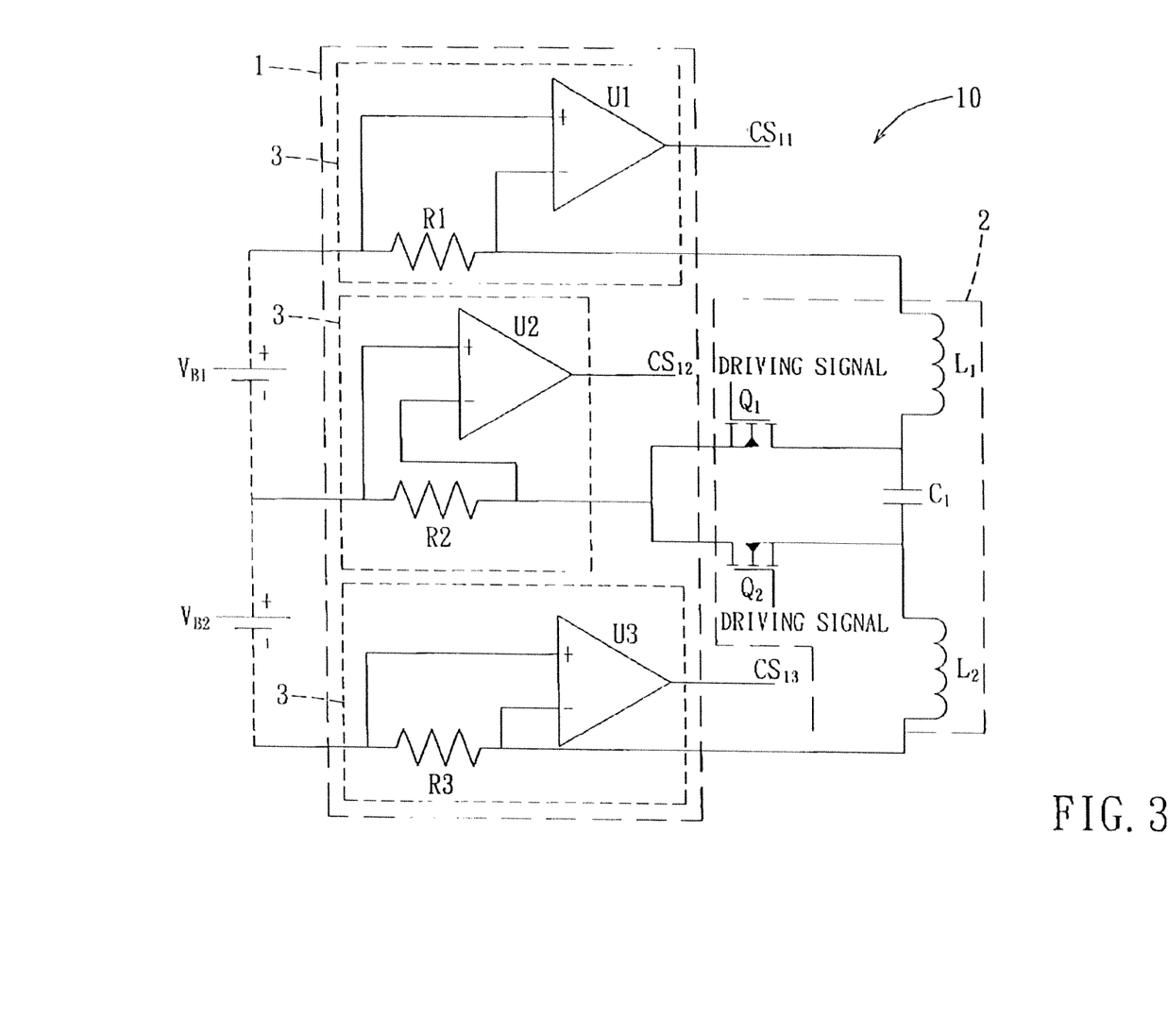
FIG. 3 is a circuit diagram of a battery equalizing module of the power supply device of the first preferred embodiment.

Referring to FIGS. 2 and 3, the first preferred embodiment of a power supply device 100 according to this invention includes a battery set ($V_B$), a plurality of battery equalizing modules 10, a control circuit 20, and a drive circuit 30. The battery set ($V_B$) consists of a number N of batteries ($V_{B1}$) to ($V_{BN}$). The battery equalizing modules 10, the control circuit 20, and the drive circuit 30 cooperate to equalize an electrical output of each of the batteries ($V_{B1}$) to ($V_{BN}$) of the battery set ($V_B$). In this embodiment, each of the battery equalizing modules 10 includes a current detecting unit 1, and a battery equalizer 2 coupled to the current detecting unit 1. The current detecting unit 1 is used for detecting current flows outputted by corresponding ones of the batteries ($V_{B1}$) to ($V_{BN}$) that are coupled to the current detecting unit 1 and the battery equalizer 2, to thereby determine whether the battery equalizer 2 is in a normal operating state. Thus, when the battery equalizer 2 is in an abnormal operating state (e.g., short circuit), damage to the corresponding ones of the batteries ($V_{B1}$) to ($V_{BN}$) that is attributed to abnormal output of electrical energy can be prevented.

In this embodiment, the batteries ($V_{B1}$) to ($V_{BN}$) are electrically connected to one another in series, and each of the batteries ($V_{B1}$) to ($V_{BN}$) is a single cell capable of storage and release of electrical energy. Each of the battery equalizing modules 10 is coupled to adjacent two of the batteries ($V_{B1}$) to ($V_{BN}$), and is configured to generate a respective output ($CS_1$) to ($CS_{N-1}$) to the control circuit 20. The control circuit 20 is coupled to the battery equalizing modules 10 for determining whether each battery equalizer 2 is in the normal operating state according to the output ($CS_1$) to ($CS_{N-1}$) of a corresponding one of the battery equalizing modules 10. The drive circuit 30 is coupled to the control circuit 20 and the battery equalizer 2 of each of the battery equalizing modules 10 so as to cooperate with the control circuit 20 to cutout driving signals to each battery equalizer 2 for driving operation of each battery equalizer 2.

Additionally, the power supply device 100 of this embodiment may further include a multiplexer 40 that has an input side coupled to the battery equalizing modules 10 and an output side coupled to the control circuit 20. The multiplexer 40 is operable to provide the output ($CS_1$) to ($CS_{N-1}$) from a selected one or more of the battery equalizing modules 10 to the control circuit 20. Accordingly, a number of input pins of the control circuit 20 may be reduced.

In this embodiment, an internal circuitry of each of the battery equalizing modules 10 is similar, and is described in the following with reference to FIG. 3.

As shown in FIG. 3, a first battery ($V_{B1}$) of the battery set ($V_B$) has a positive electrode and a negative electrode, and a second battery ($V_{B2}$) of the battery set ($V_B$) has a negative electrode and a positive electrode coupled to the negative electrode of the first battery ($V_{B1}$). The battery equalizer 2 is a non-consumptive battery equalizer and includes a first inductor (L1), a second inductor (L2), a capacitor (C1) coupled between the first and second inductors (L1) and (L2) in series, a first switch (Q1), and a second switch (Q2). One end of the first inductor (L1) opposite to the capacitor (C1) is coupled to the positive electrode of the first battery ($V_{B1}$), and one end of the second inductor (L2) opposite to the capacitor (C1) is coupled to the negative electrode of the second battery ($V_{B2}$). The first switch (Q1) has one end coupled to the negative electrode of the first battery ($V_{B1}$), and the other end coupled to one end of the capacitor (C1) corresponding to the first inductor (L1). The second switch (Q2) has one end coupled to the negative electrode of the first battery ($V_{B1}$), and the other end coupled to the other end of the capacitor (C1) corresponding to the second inductor (L2). The first and second switches (Q1), (Q2) are actuated by the driving signals from the drive circuit 30 to operate between a conducting state and non-conducting state.

In this embodiment, the current detecting unit 1 includes three identical current detecting circuits 3 that are respectively coupled between the positive electrode of the first battery ($V_{B1}$) and the battery equalizer 2, between the negative electrode of the first battery ($V_{B1}$) and the battery equalizer 2, and between the negative electrode of the second battery ($V_{B2}$) and the battery equalizer 2. Each of the current detecting circuits 3 includes a detecting resistor (R1) to (R3), and an operational amplifier (U1) to (U3). For a first one of the current detecting circuits 3, the detecting resistor (R1) has a pair of opposite ends that are respectively coupled to the first inductor (L1) of the battery equalizer 2 and the positive electrode of the first battery ($V_{B1}$). For a second one of the current detecting circuits 3, one of a pair of opposite ends of the detecting resistor (R2) is coupled to the first and second switches (Q1) and (Q2) of the battery equalizer 2, and the other one of the opposite ends of the detecting resistor (R2) is coupled to the negative electrode of the first battery ($V_{B1}$). For a third one of the current detecting circuits 3, the detecting resistor (R3) has a pair of opposite ends that are respectively coupled to the second inductor (L2) of the battery equalizer 2 and the negative electrode of the second battery ($V_{B2}$). Each of the operational amplifiers (U1) to (U3) has an inverting input end and a non-inverting input end that are respectively coupled to the opposite ends of a corresponding one of the detecting resistors (R1) to (R3), and an output end coupled to the control circuit 20 via the multiplexer 40. The operational amplifiers (U1) to (U3) generate first, second and third signal outputs ($CS_{11}$) to ($CS_{13}$) according to voltage drop across the detecting resistors (R1) to (R3), respectively. It should be noted that the output ($CS_1$) of the battery equalizing module 10 shown in FIG. 3 consists of the first, second and third signal outputs ($CS_{11}$) to ($CS_{13}$). Other outputs ($CS_2$) to ($CS_{N-1}$) of other battery equalizing modules 10 also consist of respective three signal outputs, and details thereof will be omitted herein for the sake of brevity.

Figure 4:
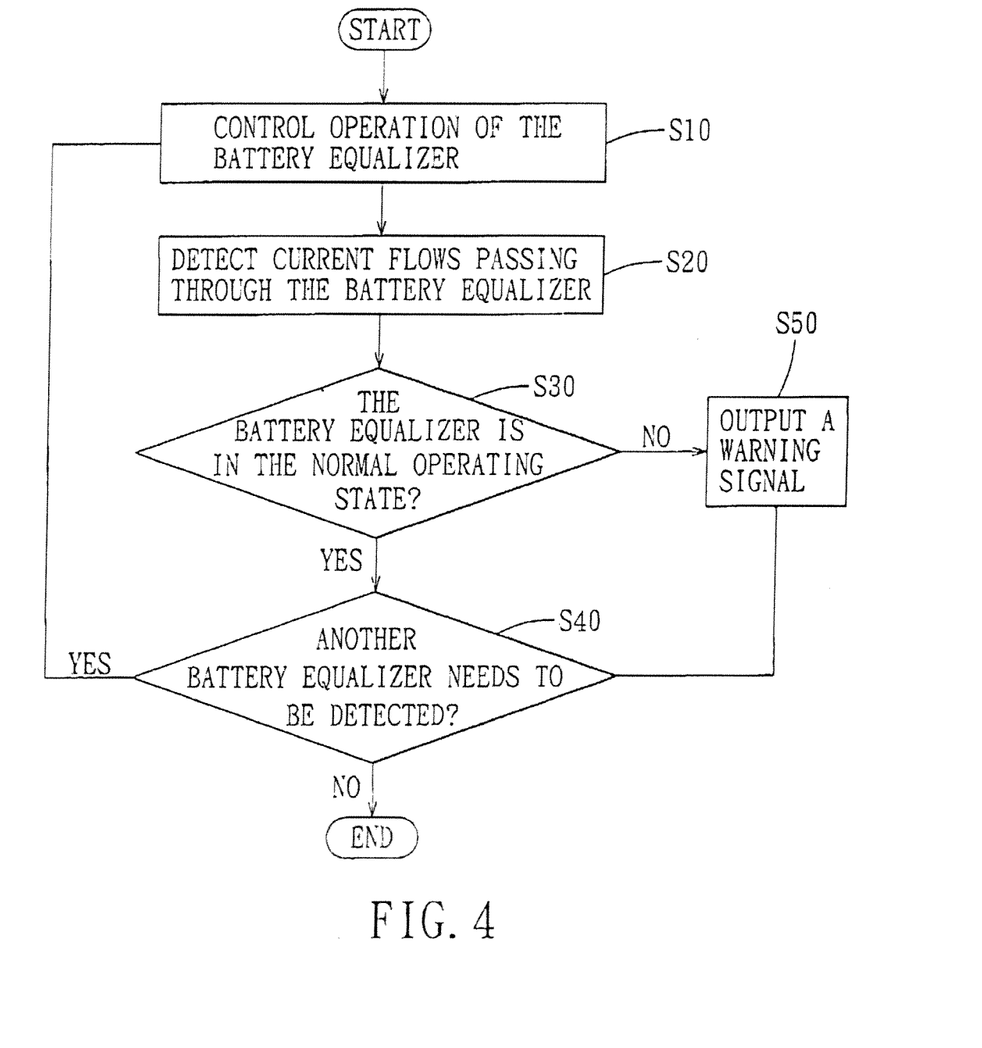
FIG. 4 is a flow chart of a method for detecting a battery equalizer according to the present invention.

Referring to FIG. 4, the battery equalizing modules 10, the control circuit 20, and the drive circuit 30 cooperate to implement a method for detecting the battery equalizer 2 of each of the battery equalizing modules 10 that includes the following steps.

Figure 5:
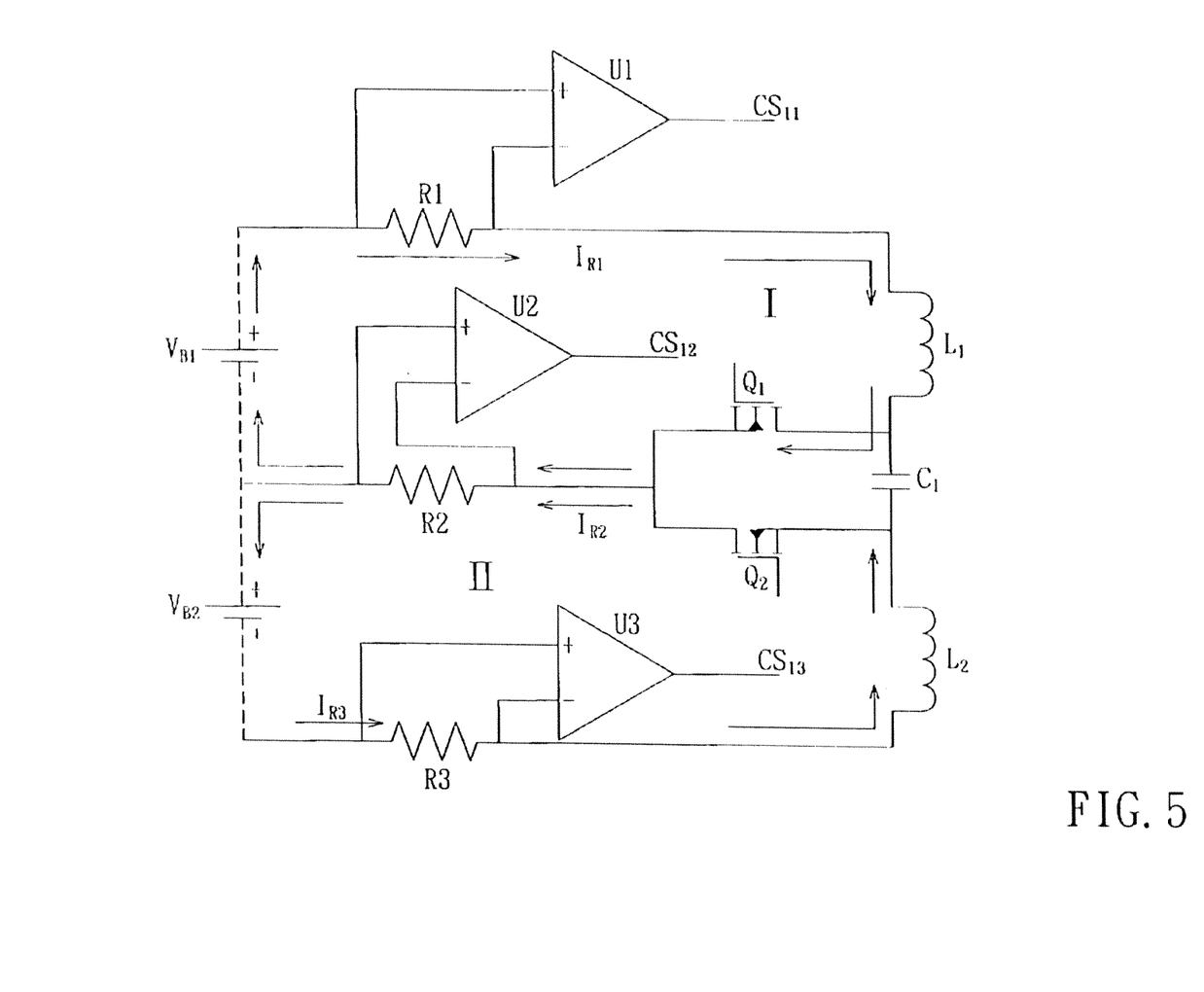
FIG. 5 is a circuit diagram of the battery equalizing module for illustrating current flows therein when a first switch thereof is in a conducting state and a second switch thereof is in a non-conducting state.
Figure 7:
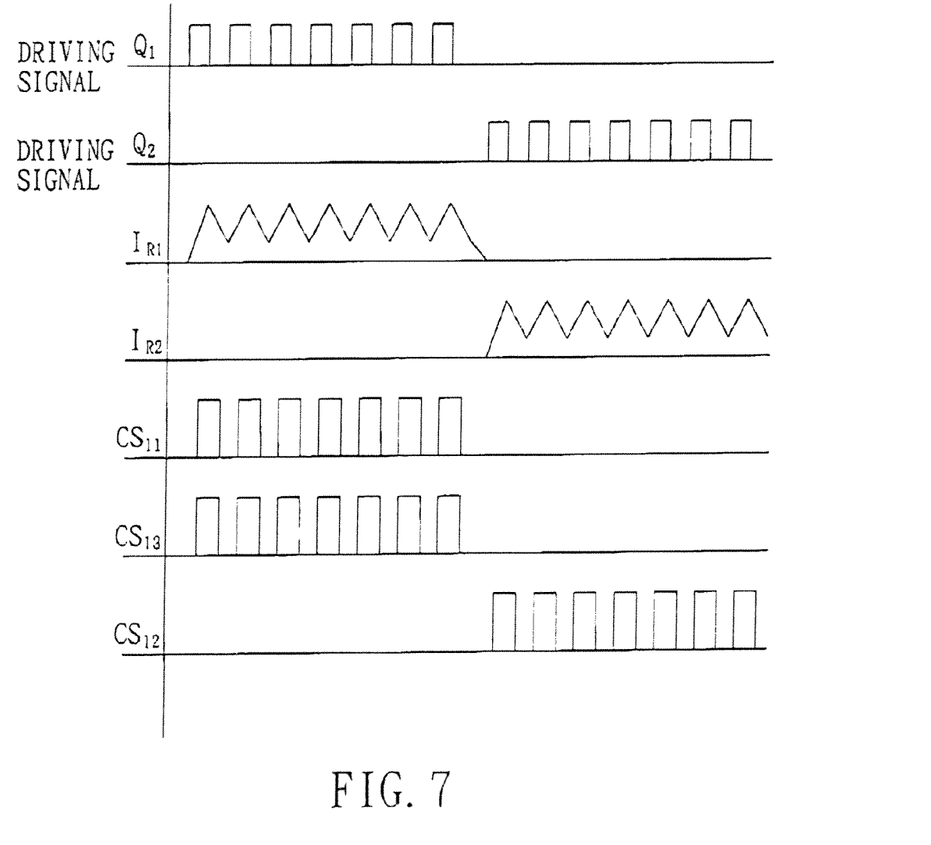
FIG. 7 is a plot for illustrating driving signals to the first and second switches, current flows passing through detecting resistors of the battery equalizing module, and signal outputs of operational amplifiers of the battery equalizing module.

In step S10, the control circuit 20 is operable to control the drive circuit 30 to actuate the first and second switches (Q1) and (Q2) of the battery equalizer 2 to operate in the conducting state and the non-conducting state, respectively, so as to generate first and second current paths (I) and (II) shown in FIG. 5. The first current path (I) passes through the first battery ($V_{B1}$), the detecting resistor (R1), the first inductor (L1), the first switch (Q1), and the detecting resistor (R2). Therefore, the first battery ($V_{B1}$) is operable to release electrical energy so as to charge the capacitor (C1). The second current path (II) passes through the capacitor (C1), the first switch (Q1), the detecting resistor (R2), the second battery ($V_{B2}$), the detecting resistor (R3), and the second inductor (L2). Therefore, the capacitor (C1) is operable to charge the second battery ($V_{B2}$). The driving signals provided to the first and second switches (Q1) and (Q2), the current flows ($I_{B1}$) and ($I_{B1}$) passing through the detecting resistors (R1) and (R2), and the signal outputs ($CS_{11}$) to ($CS_{13}$) from the operational amplifiers (U1) to (U3) are shown in FIG. 7.

In step S20, the current detecting circuits 3 of the current detecting unit 1 are operable to detect the current flows passing through the battery equalizer 2. In the first current path (I), the current flow ($I_{B1}$) from the first battery ($V_{B1}$) through the detecting resistor (R1) will result in a voltage drop across the detecting resistor (R1). The operational amplifier (U1) is operable to generate the first signal output ($CS_{11}$) according to the voltage drop across the detecting resistor (R1), and to transmit the first signal output ($CS_{11}$) to the control circuit 20 via the multiplexer 40. Simultaneously, in the second current path (II), the current flow ($I_{R2}$) from the capacitor (C1) through the detecting resistor (R3) will also result in a voltage drop across the detecting resistor (R3). The operational amplifier (U3) is operable to generate the third signal output ($CS_{13}$) according to the voltage drop across the detecting resistor (R3), and to transmit the third signal output ($CS_{13}$) to the control circuit 20 via the multiplexer 40.

It should be noted that, in the first and second current paths (I) and (II), a direction of the current flows ($I_{R1}$) and ($I_{R3}$) passing through the detecting resistors (R1) and (R3) is opposite to a direction of the current flow ($I_{R2}$) passing through the detecting resistor (R2). That is to say, a voltage value at the inverting input end of the operational amplifier (U2) is greater than a voltage value at the non-inverting input end of the operational amplifier (U2). Therefore, when the first switch (Q1) is the conducting state and the second switch (Q2) is in the non-conducting state, the operational amplifier (U2) will not generate the second signal output ($CS_{12}$), i.e., the second signal output ($CS_{12}$) is 0.

In step S30, the control circuit 20 is operable to determine, according to the signal outputs of the current detecting circuits 3, whether the battery equalizer 2 is in the normal operating state. In this embodiment, the control circuit 20 receives the first signal output ($CS_{11}$), the second signal output ($CS_{12}$) and the third signal output ($CS_{13}$) from the selected one of the battery equalizing modules 10 through the multiplexer 40, and is operable to compare the first, second and third signal outputs ($CS_{11}$) to ($CS_{13}$) with predetermined values stored in the control circuit 20. For instance, according to the operation of the first and second switches (Q1) and (Q2) in step S10, a signal level of the first and third signal outputs ($CS_{11}$) and ($CS_{13}$) should be a high level, and a signal level of the second signal output ($CS_{12}$) should be a low level.

When it is determined by the control circuit 20 in step S30 that the signal levels of the first, second and third signal outputs ($CS_{11}$) to ($CS_{13}$) conform with the predetermined values, the flow goes to step S40. In step S40, the control circuit 20 is operable to determine whether there is still a battery equalizer 2 of any one of the battery equalizing modules 10 that has yet to be detected. When it is determined that another battery equalizer 2 needs to be detected, the flow goes back to step S10.

When it is determined by the control circuit 20 in step S30 that the signal level of any one of the first, second and third signal outputs ($CS_{11}$) to ($CS_{13}$) does not conform with the corresponding predetermined value, the control circuit 20 is operable to generate and output a warning signal in step S50. For example, when the signal level of the second signal output ($CS_{12}$) from the operational amplifier (U2) is a high level instead of a low level, the control circuit 20 is operable to output the warning signal to notify a user that the battery equalizer 2 associated with the second signal output ($CS_{12}$) is in the abnormal operating state, so that the user can repair or replace the abnormal battery equalizer 2. It should be noted that various ways can be utilized to notify the user without departing from the scope of the present invention.

After the control circuit 20 detects the battery equalizer 2 of each of the battery equalizing modules 10 with the first switch (Q1) in the conducting state and the second switch (Q2) in the non-conducting state, the control circuit 20 is further operable to control the drive circuit 30 to actuate the first and second switches (Q1) and (Q2) of the battery equalizer 2 to operate in the non-conducting and conducting states, respectively (step S10). Thus, the battery equalizer 2 can be fully detected.

Figure 6:
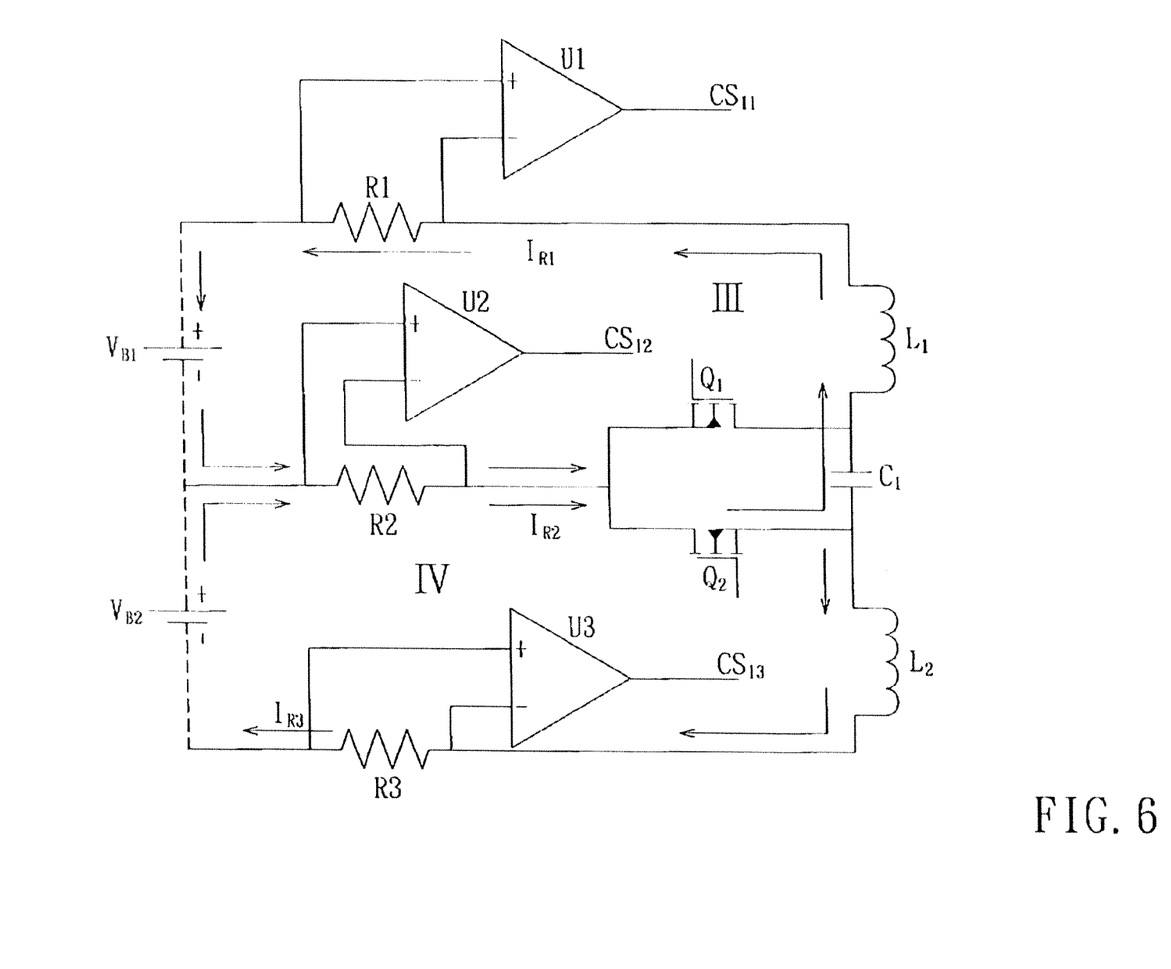
FIG. 6 is a circuit diagram of the battery equalizing module for illustrating current flows therein when the first switch is in a non-conducting state and the second switch is in a conducting state.

When the first switch (Q1) operates in the non-conducting state and the second switch (Q2) operates in the conducting state, a third current path (III) and a fourth current path (IV) pass across the selected one of the battery equalizing modules 10 as shown in FIG. 6. The third current path (III) passes through the capacitor (C1), the first inductor (L1), the detecting resistor (R1), the first battery ($V_{B1}$), the detecting resistor (R2), and the second switch (Q2). Therefore, the capacitor (C1) is operable to release electrical energy so as to charge the first battery ($V_{B1}$). The fourth current path (IV) passes through the second battery ($V_{B2}$), the detecting resistor (R2), the second switch (Q2), the second inductor (L2), and the detecting resistor (R3). Therefore, the second battery ($V_{B2}$) is operable to ease electrical energy to the second inductor (L2).

When the first switch (Q1) operates in the non-conducting state and the second switch (Q2) operates in the conducting state, the current flow ($I_{R2}$) will result in a voltage drop across the detecting resistor (R2). The operational amplifier (U2) is operable to generate the second signal output ($CS_{12}$) according to the voltage drop across the detecting resistor (R2), and to transmit the second signal output ($CS_{12}$) to the control circuit 20 via the multiplexer 40 (step S20). In the third and fourth current paths (III) and (IV), the direction of the current flows ($I_{R1}$) and ($I_{R3}$) passing through the detecting resistors (R1) and (R3) is opposite to the direction of the current flow ($I_{R2}$) passing through the detecting resistor (R2). That is to say, a voltage value at the inverting input end of the operational amplifier (U1) is greater than a voltage value at the non-inverting input end of the operational amplifier (U1), and a voltage value at the inverting input end of the operational amplifier (U3) is greater than a voltage value at the non-inverting input end of the operational amplifier (U3). Therefore, the operational amplifiers (U1) and (U3) will not generate the first and third signal outputs ($CS_{11}$) and ($CS_{13}$), i.e., the first and third signal outputs ($CS_{11}$) and ($CS_{13}$) are 0 (see FIG. 7).

Similarly, the control circuit 20 is operable to compare the first, second and third signal outputs ($CS_{11}$) to ($CS_{13}$) with the predetermined values, i.e., the signal level of the first and third signal outputs ($CS_{11}$) and ($CS_{13}$) should be a low level, and the signal level of the second signal output ($CS_{12}$) should be a high level in this case. Accordingly, the control circuit 20 is operable to determine whether abnormal charging or discharging has occurred among the first and second batteries ($V_{B1}$) and ($V_{B2}$) and the battery equalizer 2.

Figure 8:
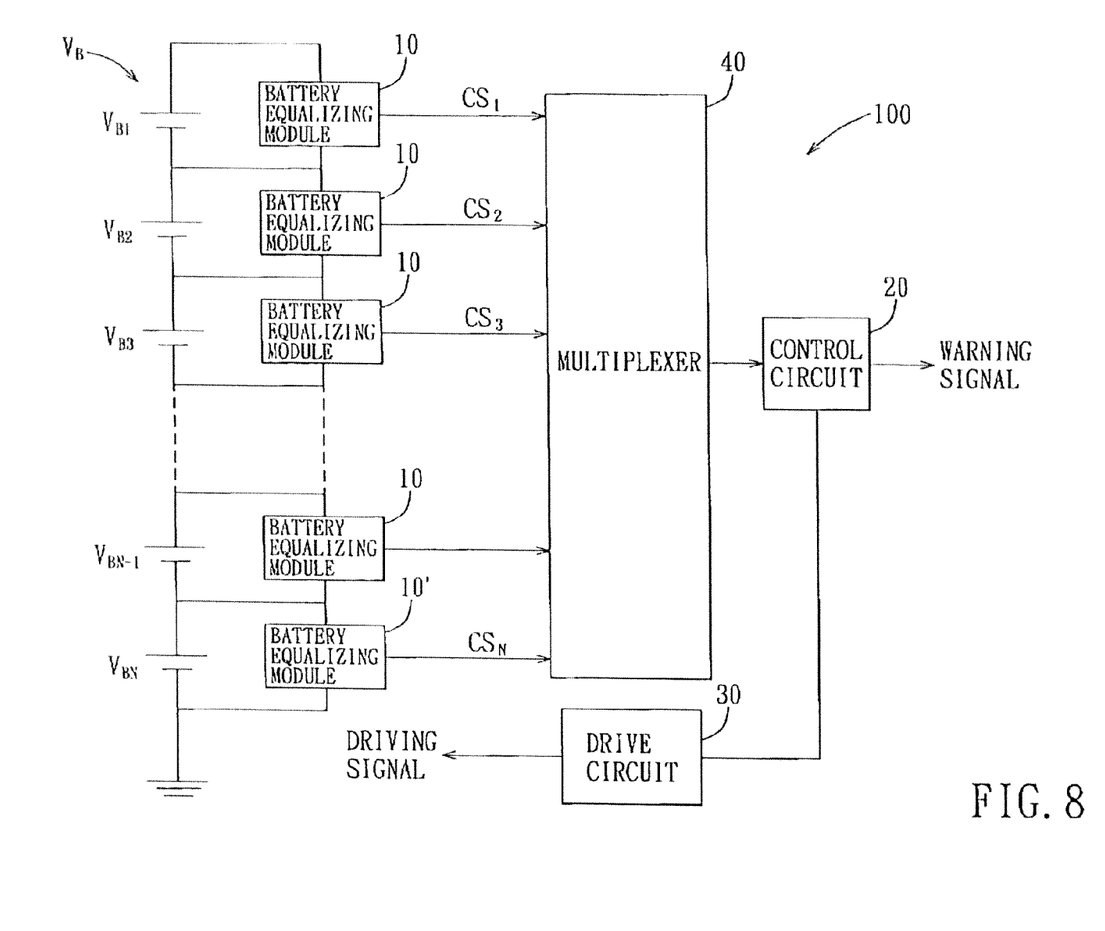
FIG. 8 is block diagram of a second preferred embodiment of a power supply device according to the present invention.
Figure 9:
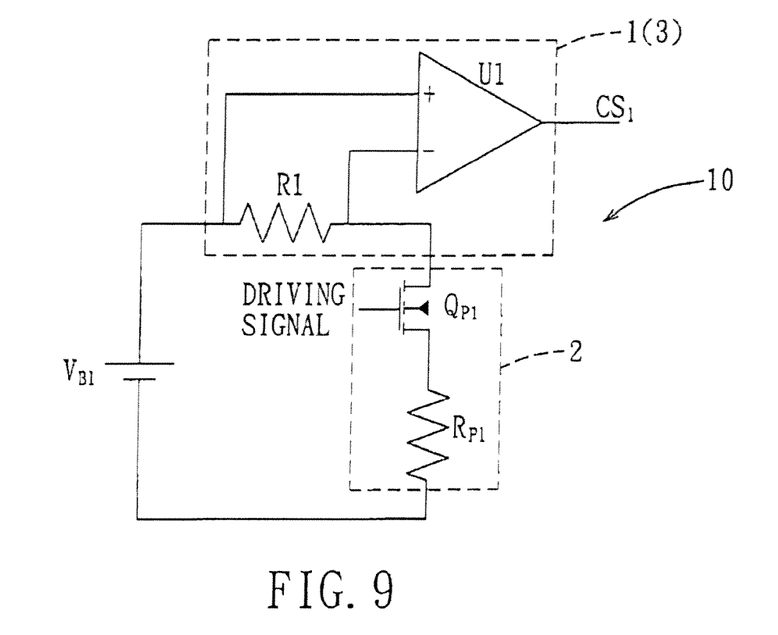
FIG. 9 is a circuit diagram of a battery equalizing module of the power supply device of the second preferred embodiment.

Referring to FIGS. 8 and 9, the second preferred embodiment of a power supply device 100 of this invention includes a battery set ($V_B$) consisting of a number N of batteries ($V_{B1}$) to ($V_{BN}$), a number N of battery equalizing modules 10 (10'), a control circuit 20, a drive circuit 30, and a multiplexer 40. As shown in FIG. 9, taking a corresponding one of the battery equalizing modules 10 that is coupled to a first battery ($V_{B1}$) of the battery set ($V_B$) for illustration, the corresponding one of the battery equalizing modules 10 includes a current detecting unit 1, and a battery equalizer 2 coupled to the current detecting unit 1. In this embodiment, the battery equalizer 2 is a consumptive battery equalizer, and includes a power switch ($Q_{P1}$) and a series resistor ($R_{P1}$). The first battery ($V_{B1}$) the power switch ($Q_{P1}$) and the series resistor ($R_{P1}$) are coupled to one another in series to thereby form a current loop. When the power switch ($Q_{P1}$) operates in a conducting state, the first battery ($V_{B1}$) is operable to release electrical energy to the series resistor ($R_{P1}$).

In this embodiment, the current detecting unit 1 includes a single current detecting circuit 3, and the current detecting circuit 3 includes a detecting resistor (R1) and an operational amplifier (U1). The detecting resistor (R1) has a pair of opposite ends that are respectively coupled to the first battery ($V_{B1}$) and the power switch ($Q_{P1}$) of the battery equalizer 2. The operational amplifier (U1) has an inverting input end and a non-inverting input end that are respectively coupled to the opposite ends of the detecting resistor (R1), and an output end coupled to the control circuit 20 via the multiplexer 40. The operation of the current detecting unit 1 is similar to that of the first preferred embodiment, and details thereof will be omitted herein for the sake of brevity.

Figure 10:
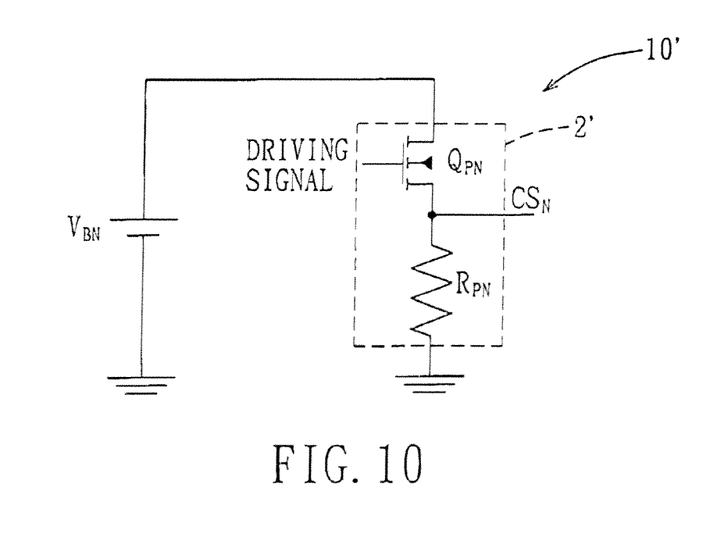
FIG. 10 is a circuit diagram of a particular one of the battery equalizing modules of the power supply device of the second preferred embodiment.

It should be noted that the battery equalizing modules 10 that correspond to the batteries ($V_{B1}$) to ($V_{BN-1}$) have the same configuration shown in FIG. 9. However, the $N^{th}$ battery equalizing module 10' corresponding to the $N^{th}$ battery ($V_{BN}$) of the battery set ($V_B$) only includes a battery equalizer 2' as shown in FIG. 10. The battery equalizer 2' is coupled to the control circuit 20 via the multiplexer 40 for providing the output ($CS_N$), and includes a series resistor ($R_{PN}$), a power switch ($Q_{PN}$) coupled to the series resistor ($R_{PN}$), and an output end (OUT) coupled between the power switch ($Q_{PN}$) and the series resistor ($R_{PN}$). The negative electrode of the $N^{th}$ battery ($V_{BN}$) of the battery set ($V_B$) and one end of the series resistor ($R_{PN}$) of battery equalizer 2' are grounded. Therefore, when the power switch ($Q_{PN}$) is in a conducting state, the $N^{th}$ battery ($V_{BN}$) is operable to release electrical energy to the series resistor ($R_{PN}$).

In this case, the output ($CS_N$) or the battery equalizing module 10' is provided to the control circuit 20 through the output end (OUT) since a voltage value at the other end of the series resistor ($R_{PN}$) opposite to the power switch ($Q_{PN}$) is 0.

In this embodiment, the battery equalizing modules 10 (10'), the control circuit 20, and the drive circuit 30 also cooperate to implement the method for detecting the battery equalizer 2 (2') of each of the battery equalizing modules 10 (10') that includes the above-mentioned steps S10 to S50.

In conclusion, regarding the operation of the power supply device 100 according to the present invention, the control circuit 20 is operable to control the drive circuit 30 to actuate operation of the battery equalizer 2 (2'), and the current detecting unit 1 is operable to generate the output based on the detected current flow through the battery equalizer 2 (2') Therefore, the control circuit 20 is operable to determine whether the battery equalizer 2 (2') is in the normal operating state according to the output from the current detecting unit 1. When it s determined that th battery equalizer 2 (2') is in the abnormal operating state, the control circuit 20 is further operable to generate the warning signal to notify the user, and the user can repair or replace the abnormal battery equalizer 2 for maintaining the service life of the battery set ($V_B$).

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A detecting module for detecting a battery equalizer of a power supply device, the power supply device further including a battery set, said detecting module comprising:
a current detecting unit to be coupled to the battery equalizer and the battery set of the power supply device, for generating an output based on detected current flow through the battery equalizer;
a drive circuit to be coupled to the battery equalizer for driving operation of the battery equalizer; and
a control circuit coupled to said drive circuit and said current detecting unit, for controlling said drive circuit to drive operation of the battery equalizer and for determining, according to the output of said current detecting unit, whether the battery equalizer is in a normal operating state.

2. The detecting module as claimed in claim 1, the battery set of the power supply device including a first battery that has a positive electrode and a negative electrode, and a second battery that has a negative electrode and a positive electrode coupled to the negative electrode of the first battery,
wherein said current detecting unit includes three current detecting circuits that are to be respectively coupled between the positive electrode of the first battery and the battery equalizer, between the negative electrode of the first battery and the battery equalizer, and between the negative electrode of the second battery and the battery equalizer.

3. The detecting module as claimed in claim 2, wherein each of said current detecting circuits includes:
a detecting resistor having a pair of opposite ends that are to be respectively coupled to the battery equalizer and a corresponding one of the first and second batteries of the battery set; and
an operational amplifier having an inverting input end and a non-inverting input end that are respectively coupled to said opposite ends of said detecting resistor, and an output end coupled to said control circuit;
said operational amplifier generating a signal output according to a voltage drop across said detecting resistor, wherein said signal outputs of said current detecting circuits serve as the output of said current detecting unit.

4. The detecting module as claimed in claim 3, further comprising a multiplexer having an input side coupled to said current detecting circuits and an output side coupled to said control circuit, said multiplexer being operable to provide said signal output from a selected one of said current detecting circuits to said control circuit.

5. The detecting module as claimed in claim 1, wherein said current detecting unit is to be electrically connected to the battery set and the battery equalizer in series to form a loop, said current detecting unit including:
a detecting resistor having a pair of opposite ends that are to be respectively coupled to the battery equalizer and the battery set; and
an operational amplifier having an inverting input end and a non-inverting input end that are respectively coupled to said opposite ends of said detecting resistor, and an output end coupled to said control circuit;
said operational amplifier generating a signal output according to a voltage drop across said detecting resistor, wherein said signal output of said operational amplifier serves as the output of said current detecting unit.

6. A power supply device, comprising:
a battery set;
a battery equalizer coupled to said battery set;
a current detecting unit coupled to said battery equalizer and said battery set for generating an output based on detected current flow through said battery equalizer;
a drive circuit coupled to said battery equalizer for driving operation of said battery equalizer; and
a control circuit coupled to said drive circuit and said current detecting unit, for controlling said drive circuit to drive operation of said battery equalizer and for determining, according to the output of said current detecting unit, whether said battery equalizer is in a normal operating state.

7. The power supply device as claimed in claim 6, wherein:
said battery set includes a first battery having a positive electrode and a negative electrode, and a second battery having a negative electrode and a positive electrode coupled to said negative electrode of said first battery; and
said current detecting unit includes three current detecting circuits that are respectively coupled between said positive electrode of said first battery and said battery equalizer, between said negative electrode of said first battery and said battery equalizer, and between said negative electrode of said second battery and said battery equalizer.

8. The power supply device as claimed in claim 7, wherein each of said current detecting circuits includes:
 a detecting resistor having a pair of opposite ends that are respectively coupled to said battery equalizer and a corresponding one of said first and second batteries of said battery set; and
 an operational amplifier having an inverting input end and a non-inverting input end that are respectively coupled to said opposite ends of said detecting resistor, and an output end coupled to said control circuit;
 said operational amplifier generating a signal output according to a voltage drop across said detecting resistor, wherein said signal outputs of said current detecting circuits serve as the output of said current detecting unit.

9. The power supply device as claimed in claim 8, further comprising a multiplexer having an input side coupled to said current detecting circuits and an output side coupled to said control circuit, said multiplexer being operable to provide said signal output from a selected one of said current detecting circuits to said control circuit.

10. The power supply device as claimed in claim 6, wherein said current detecting unit is electrically connected to said battery set and said battery equalizer in series to form a loop, said current detecting unit including:
 a detecting resistor having a pair of opposite ends that are respectively coupled to said battery equalizer and said battery set; and
 an operational amplifier having an inverting input end and a non-inverting input end that are respectively coupled to said opposite ends of said detecting resistor, and an output end coupled to said control circuit;
 said operational amplifier generating a signal output according to a voltage drop across said detecting resistor, wherein said signal output of said operational amplifier serves as the output of said current detecting unit.

11. A method for detecting a battery equalizer that is coupled to a battery set, said method to be implemented using a detecting module, and comprising the steps of:
 a) configuring the detecting module to control operation of the battery equalizer for releasing energy stored in the battery set to the battery equalizer;
 b) configuring the detecting module to detect a current flow passing through the battery equalizer; and
 c) configuring the detecting module to determine whether the battery equalizer is in a normal operating state according to the current flow detected in step b).

* * * * *